Aug. 17, 1948.     J. A. REYNIERS     2,447,468
FILM HOLDER AND FILM ENVELOPE
TO BE USED THEREWITH
Filed May 23, 1945                                  2 Sheets-Sheet 1

JAMES A. REYNIERS.
INVENTOR.

BY Oltsch & Knoblock
ATTORNEYS.

Aug. 17, 1948. J. A. REYNIERS 2,447,468
FILM HOLDER AND FILM ENVELOPE
TO BE USED THEREWITH
Filed May 23, 1945 2 Sheets-Sheet 2

JAMES A. REYNIERS.
INVENTOR.

BY Oltsch & Knoblock

ATTORNEYS.

Patented Aug. 17, 1948

2,447,468

UNITED STATES PATENT OFFICE 2,447,468

FILM HOLDER AND FILM ENVELOPE TO BE USED THEREWITH

James A. Reyniers, Niles, Mich.

Application May 23, 1945, Serial No. 595,414

12 Claims. (Cl. 95—66)

This invention relates to a film holder. More particularly, it relates to a holder for photographic film bearing micro-images.

The primary object of the invention is to provide a holder for permanently mounting a film while it is being exposed, developed, handled and filed, and while positioned in a projector.

A further object is to provide a film holder which protects and supports the film and avoids the necessity for touching the surface thereof while being handled.

A further object is to provide a film holder or mount which eliminates the need for use of separate film holders or plate holders of the type removably mounting a film and having a slide for selectively exposing or shielding the film carried thereby.

A further object is to provide a device of this character which simplifies the use and handling of micro film and makes possible the handling and manipulating of the film for all purposes without great skill.

A further object is to provide a film holder having a light proof flexible cover adhered thereto by a pressure sensitive adhesive and adapted to be stripped away to expose a film in the holder and to be replaced and re-adhered in operative film shielding relation.

A further object is to provide in combination, a film carrier mounted on a photographic apparatus and a film holder having a flexible light shield adapted to be stripped therefrom when inserted in the carrier and to be automatically replaced in shielding position as the film holder is removed from the carrier.

Other objects will be apparent from the description, drawings and appended claims.

Figure 1:
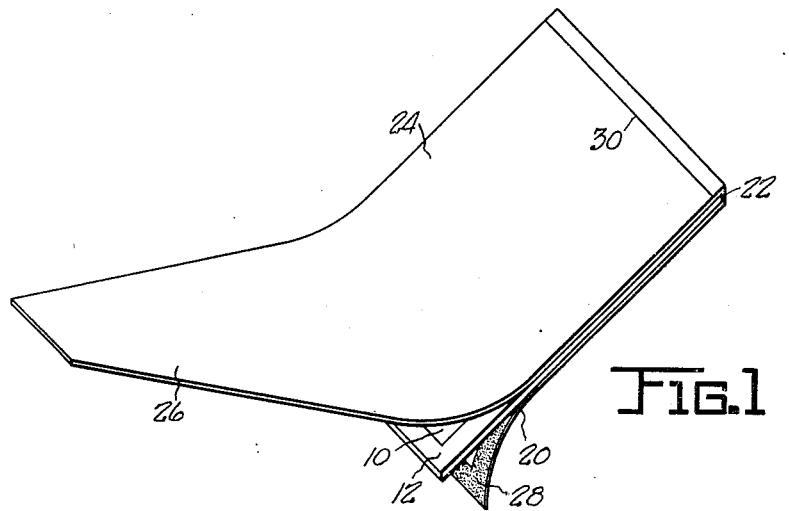
Fig. 1 is a perspective view of the film holder.
Figure 2:
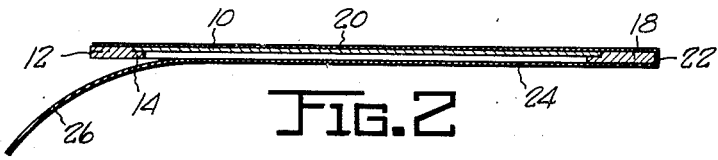
Fig. 2 is a longitudinal sectional view of the film holder.
Figure 3:
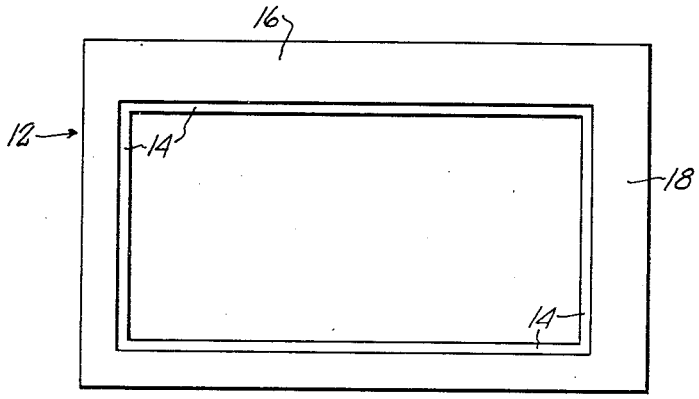
Fig. 3 is a face view of the frame of the film holder.
Figure 4:
Fig. 4 is an enlarged detail sectional view of the film holder.
Figure 5:
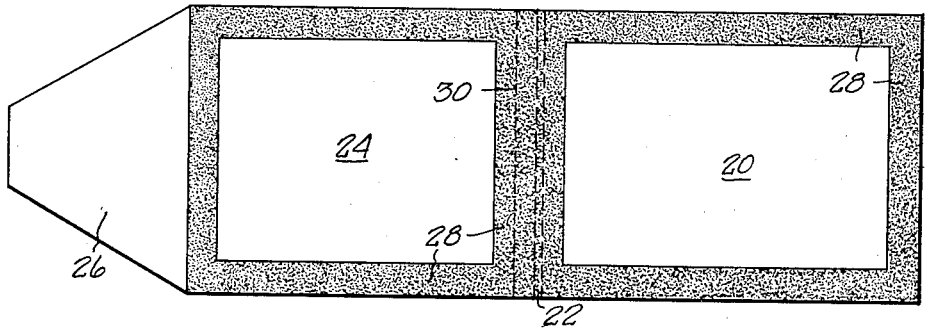
Fig. 5 is a plan view of the blank forming the light shield of the film holder.

Referring to the drawings, and particularly to Figs. 1 to 4 thereof, the numeral 10 designates a flat rectangular photographic film, preferably of the type adapted for the recording of micro-images thereon. The film is mounted in a frame 12 which is formed of a material which is relatively unaffected by water and by film developing solutions, such as plastic material or paper board impregnated or treated with asphalt, plastic material or other protective material. Frame 12 preferably has at least a small measure of flexibility. The frame has a rectangular film exposing opening therein defined by a reduced thickness marginal flange 14. The margin of the sensitized face of the film bears against the inset face of flange 14 and is permanently secured or adhered thereto, as by an adhesive which is not affected by water or film developing solutions. If the frame is formed of a plastic, the film may be bonded thereto. The face of the flange is inset a distance slightly greater than the thickness of the film, as shown in Fig. 4, so that the outer or rear surface of the film is inset from the surface of the frame, and the frame serves to protect the film. The inset may be in the order of a few thousandths of an inch. The thickness of the flange provides an inset position of the opposite film surface, i. e., the sensitized film surface. The film receiving recess is preferably the same size as the film to receive the film snugly and without substantial clearance at the film edges. The top portion 16 of the frame is preferably wider than the bottom portion, so that titles or other indicia may be recorded thereon. One side 18 of the frame is also preferably wider than the opposite side.

A light proof paper cover sheet is applied to the frame and is preferably formed of black photographic cover stock. The cover sheet or blank is elongated and transversely folded to form a plurality of panels or sections. Back panel 20 spans the back surface of the frame, an intermediate portion 22 is folded around the edge of the marginal portion 18 of the frame, a front panel 24 spans the front face of the frame, and a tab 26 of tapered shape projects laterally beyond the frame. The dimensions of the frame-engaging cover sheet parts are preferably slightly less than the similar dimensions of the frame so that the various sheet panels terminate just short of the outer edges of the frame. The inner faces of the parts 20, 22 and 24 have a pressure sensitive adhesive 28 applied thereto at the portions thereof which engage the frame. This adhesive normally serves to adhere the cover sheet to the frame and effectively exclude light from the film. The front panel 24 also has a transverse fold 30 formed therein at a point approximately mid-width of frame part 18.

The construction of the film holder provides a permanent mounting for the film in which it is retained during storage, exposure, development, drying, filing and projection. In other words, the frame and film form a permanent unit. The cover forms a part of this unit during its initial handling and usage, and until the film has been developed, and can be removed completely thereafter, if desired. This cover excludes light effectively and also protects the film emulsion from dust and dirt. The cover can be stripped away to permit exposure of the film and can be reapplied or resealed to protect the film between the exposing and developing processes. Hence the construction is self-contained, and it is not necessary to provide special plate holders of the type commonly required for working with flat sheets of photographic film.

Figure 6:
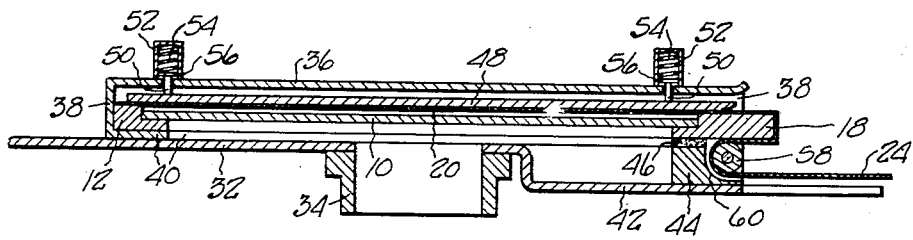
Fig. 6 is a longitudinal sectional view of the film carrier of a photographic apparatus with the film holder mounted therein.
Figure 7:
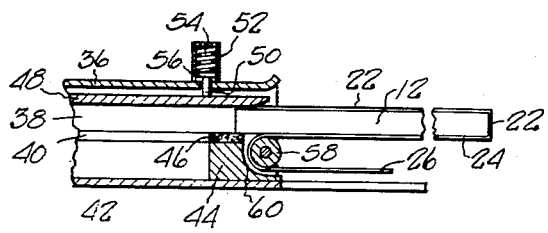
Fig. 7 is a fragmentary sectional view of the film carrier with the film holder partially inserted in the carrier.

I also contemplate, as a part of this invention, the provision of a novel film carrier in the photographic apparatus, such as a camera, in which the film is used. This film carrier is shown in Figs. 6 and 7, wherein the numeral 32 designates a portion of a wall of the housing of the apparatus and 34 a lens mount. Alternatively, the member 32 may constitute a part of a cross slide device in a camera, etc. The carrier is positioned within the housing of the apparatus and comprises a back panel 36 in spaced parallel relation to member 32 and having marginal flanges 38 at its longitudinal sides and inner end, which flanges bear against member 32 and cooperate therewith and with panel 36 to define an open ended film chamber. Narrow flanges 40 may be inturned from flanges 38 in face engagement with member 32 to provide guides adapted to be engaged by the frame 12. The portion 42 of member 32 adjacent to the open end of the chamber is preferably outwardly off-set and mounts a cross bar 44. A light barrier, such as a felt strip 46, is carried by the inner face of bar 44 for engagement with the end portion 18 of the frame when the frame is operatively positioned in the carrier as shown in Fig. 6. A plate 48 is mounted in the carrier by means of studs 50 which extend through panel 36 and into cup shaped members 52 which receive coil springs 54 bearing against enlarged heads 56 on the upper ends of the studs 50. Plate 48 is of a size slightly smaller than the chamber in which it is mounted but large enough to bear firmly and uniformly upon the frame 12 at all portions thereof.

A transverse roller 58 is journaled in the apparatus adjacent to the cross bar 44 and is of a length to completely span the carrier at its open end. The cross bar 44 has a curved guide surface 60 spaced from and substantially concentric with roller 58. The roller 58 is so positioned that it bears firmly against the cover sheet 24 when the film holder is partially or fully inserted in the carrier chamber.

The construction of the carrier is particularly adapted for the film holder, and cooperates therewith to manipulate the light shield properly and semi-automatically. When the film is to be inserted in the film carrier, the projecting cover flap 26 is first passed around the roller 58, as facilitated by the guide surface 60 of bar 44. The leading edge or side of the film holder is then inserted in the carrier under the plate 48, and the end of the cover flap 26 is pulled to strip the cover panel 24 from the frame 12. This serves, either alone or with coincident inward pushing of the frame, to move the film frame into the carrier. The stripping of the cover panel from the frame occurs immediately in advance of the light barrier 46. The small clearance between the roller 58 and the barrier 46 and cross bar 44, together with the curvature of the passage between said parts, effectively excludes the possibility of light striking the film, particularly in view of the fact that the cover sheet lies in the passage and thus further restricts it. When the film holder is completely seated or inserted in the carrier, the inner margin of the wide frame portion 18 is engaged by the light shield, thus positively excluding or preventing light leakage to the film while the camera or other apparatus is loaded. The frame portion 18 is wide enough to permit a portion thereof adequate to be grasped easily to project outwardly relative to the roller 58, the fold 30 constituting the point at which the stripping of the film from the frame terminates.

When the film holder is withdrawn from the film, as by grasping the frame part 18 to pull the frame, the roller 58 feeds the cover sheet or panel 24 back to the frame 12 smoothly and presses it to effect firm adhesion thereof on the frame by the pressure sensitive adhesive 28. The spring pressure acting through plate 48 upon the frame provides the sealing pressure. Also, it insures accurate location of the film in the camera or other apparatus for focusing purposes and positive contact of the film frame with the light barrier 46.

The combination of the film holder and carrier as above described makes for simple and convenient photographic practice, and for simplification and reduction of photographic equipment. The film holder becomes a self-contained device providing its own removable light shield, and is of universal application in all phases of photographic processing and usage. Many operations, such as plate handling, slide manipulation, and mounting of the film after development thereof, are eliminated. The device is particularly well suited for use with flat film bearing micro-images, and makes practical the handling, filing and general usage of such film after the manner in which file cards are commonly used in office practice. This is a marked improvement over the use of roll film for micro copy as is now conventional.

I claim:

1. A film holder comprising a frame having a central opening defined in part by a reduced thickness flange and adapted to permanently mount a photographic film therein secured marginally to said flange, opaque light shields continuously secured to one of the opposite faces of said frame and spanning said opening, at least the shield adjacent to the sensitized face of said film being flexible and adhered marginally to at least three marginal sides of said frame by a pressure sensitive adhesive, said last named shield including a tab portion projecting from said frame at one adhered marginal portion thereof.

2. A film holder comprising a frame having a central opening adapted to permanently mount a photographic film therein, opaque light shields continuously marginally secured to the opposite faces of said frame and spanning said opening, the shield adjacent to the sensitized face of said film being flexible and secured to the face of said frame at least at two sides and one end thereof by a pressure sensitive adhesive and having a tab at said last named end projecting beyond said frame, said opening being stepped to receive and support the film in inwardly spaced relation to said light shields, said shields being formed integrally from a single sheet folded around one end of said frame.

3. A film holder comprising a frame having a central stepped opening adapted to permanently mount a photographic film therein, an opaque light shield folded around one end of said frame to provide panels secured continuously to the margins of the opposite faces of said frame and spanning said opening, at least the panel adjacent to the sensitized face of said film being flexible and adhered marginally to said frame at its sides and ends by a pressure sensitive adhesive and having a flap projecting outwardly beyond the last named end of said frame.

4. A film holder comprising a frame having a central stepped opening adapted to permanently mount a photographic film therein inset from the faces of the frame, opaque light shields continuously secured to the opposite faces of said frame and spanning said opening, at least the shield adjacent to the sensitized face of said film being flexible and adhered marginally to said frame at least at three sides by a pressure sensitive adhesive, said shields being formed integrally and folded around one end of said frame and one thereof projecting from said frame at the end thereof opposite said fold, said frame being formed of a material resistant to water and to film developing solutions.

5. A film holder comprising a frame having a central stepped opening adapted to permanently mount a photographic film therein inset from the faces of the frame, opaque light shields continuously secured to the opposite faces of said frame and spanning said opening, at least the shield adjacent to the sensitized face of said film being flexible and adhered marginally to said frame at least at three sides by a pressure sensitive adhesive and having a tab portion projecting beyond the edge of said frame at one end, said frame being formed of plastic material unaffected by moisture and film developing solutions and characterized by at least a small measure of flexibility and by a marginal portion of increased width opposite the marginal portion adjacent to said tab.

6. A film holder comprising a frame having a central stepped opening adapted to permanently mount a photographic film inset from the faces of said frame, and an elongated flexible opaque sheet folded around said frame to span the opposite faces thereof and adhered continuously to said frame at both faces by a pressure sensitive adhesive, one end of said sheet projecting freely outwardly from said frame, the marginal portion of said frame adjacent said fold being wider than the opposite marginal portion.

7. In combination, a film carrier mounted in a photographic apparatus and defining a chamber open at one end, a light barrier adjacent the mouth of said chamber, a transverse abutment adjacent said barrier, a film holder having a central opening, a film mounted in said opening, light shields spanning said opening at opposite faces of said frame, at least one of said shields being flexible and secured to said frame by pressure sensitive adhesive whereby it is removable to pass around said abutment outwardly of said light barrier when said holder is positioned in said carrier.

8. In combination, a film carrier mounted in a photographic apparatus and defining a chamber open at one end, a light barrier adjacent the mouth of said chamber, a transverse abutment adjacent said barrier, a film holder having a central opening, a film mounted in said opening, light shields spanning said opening at opposite faces of said frame, at least one of said shields being flexible and secured to said frame by pressure sensitive adhesive whereby it is removable to pass around said abutment outwardly of said light barrier when said holder is positioned in said carrier, said last named shield including a projecting flap portion.

9. In combination, a film carrier mounted in a photographic apparatus and defining a chamber open at one end, a light barrier adjacent the mouth of said chamber, a transverse abutment adjacent said barrier, a film holder having a central opening, a film mounted in said opening, light shields spanning said opening at opposite faces of said frame, at least one of said shields being flexible and secured to said frame by pressure sensitive adhesive whereby it is removable to pass around said abutment outwardly of said light barrier when said holder is positioned in said carrier, and spring pressed means in said chamber for urging said film holder against said light barrier and said abutment.

10. In combination, a film carrier mounted in a photographic apparatus and defining a chamber open at one end, a light barrier adjacent the mouth of said chamber, a transverse abutment adjacent said barrier, a film holder having a central opening, a film mounted in said opening, light shields spanning said opening at opposite faces of said frame, at least one of said shields being flexible and secured to said frame by pressure sensitive adhesive whereby it is removable to pass around said abutment outwardly of said light barrier when said holder is positioned in said carrier, said abutment constituting a roller.

11. In combination, a film carrier mounted in a photographic apparatus and defining a chamber open at one end, a light barrier adjacent the mouth of said chamber, a transverse abutment adjacent said barrier, a film holder having a central opening, a film mounted in said opening, light shields spanning said opening at opposite faces of said frame, at least one of said shields being flexible and secured to said frame by pressure sensitive adhesive whereby it is removable to pass around said abutment outwardly of said light barrier when said holder is positioned in said carrier, said abutment constituting a roller, and a curved guide projecting from said light barrier in close spaced substantially concentric relation with said roller.

12. In combination, a film carrier mounted in a photographic apparatus and defining a chamber open at one end, a light barrier adjacent the mouth of said chamber, a transverse abutment adjacent said barrier, a film holder having a central opening, a film mounted in said opening, light shields spanning said opening at opposite faces of said frame, at least one of said shields being flexible and secured to said frame by pressure sensitive adhesive whereby it is removable to pass around said abutment outwardly of said light barrier when said holder is positioned in said carrier, said light shields being formed from a sheet of flexible material folded around said frame and terminating at one end in a flap projecting from said frame.

JAMES A. REYNIERS.

REFERENCES CITED

The following references are of record in the file of this patent:

UNITED STATES PATENTS

| Number | Name | Date |
|---|---|---|
| 660,394 | Reardon | Oct. 23, 1900 |
| 783,613 | Clarke | Feb. 28, 1905 |
| 915,988 | Moore | Mar. 23, 1909 |
| 1,305,096 | Hansen | May 27, 1919 |
| 1,950,863 | Pajuin | Mar. 13, 1934 |
| 2,049,497 | Gickon | Aug. 4, 1936 |
| 2,074,890 | Casler | Mar. 23, 1937 |
| 2,099,976 | Hagedorn | Nov. 23, 1937 |
| 2,168,418 | Lukis | Aug. 8, 1939 |
| 2,263,023 | Windolph | Nov. 18, 1941 |
| 2,351,877 | Rabkin et al. | June 20, 1944 |